March 28, 1933.    H. D. STEVENS    1,903,202
COLLAPSIBLE TIRE FORM
Filed March 11, 1931    7 Sheets-Sheet 1

INVENTOR
HORACE D. STEVENS
Ely & Barrow
ATTORNEYS

March 28, 1933.   H. D. STEVENS   1,903,202
COLLAPSIBLE TIRE FORM
Filed March 11, 1931   7 Sheets-Sheet 2

INVENTOR
HORACE D. STEVENS
BY
ATTORNEYS

March 28, 1933.   H. D. STEVENS   1,903,202
COLLAPSIBLE TIRE FORM
Filed March 11, 1931   7 Sheets-Sheet 3

INVENTOR
HORACE D. STEVENS
BY
ATTORNEYS.

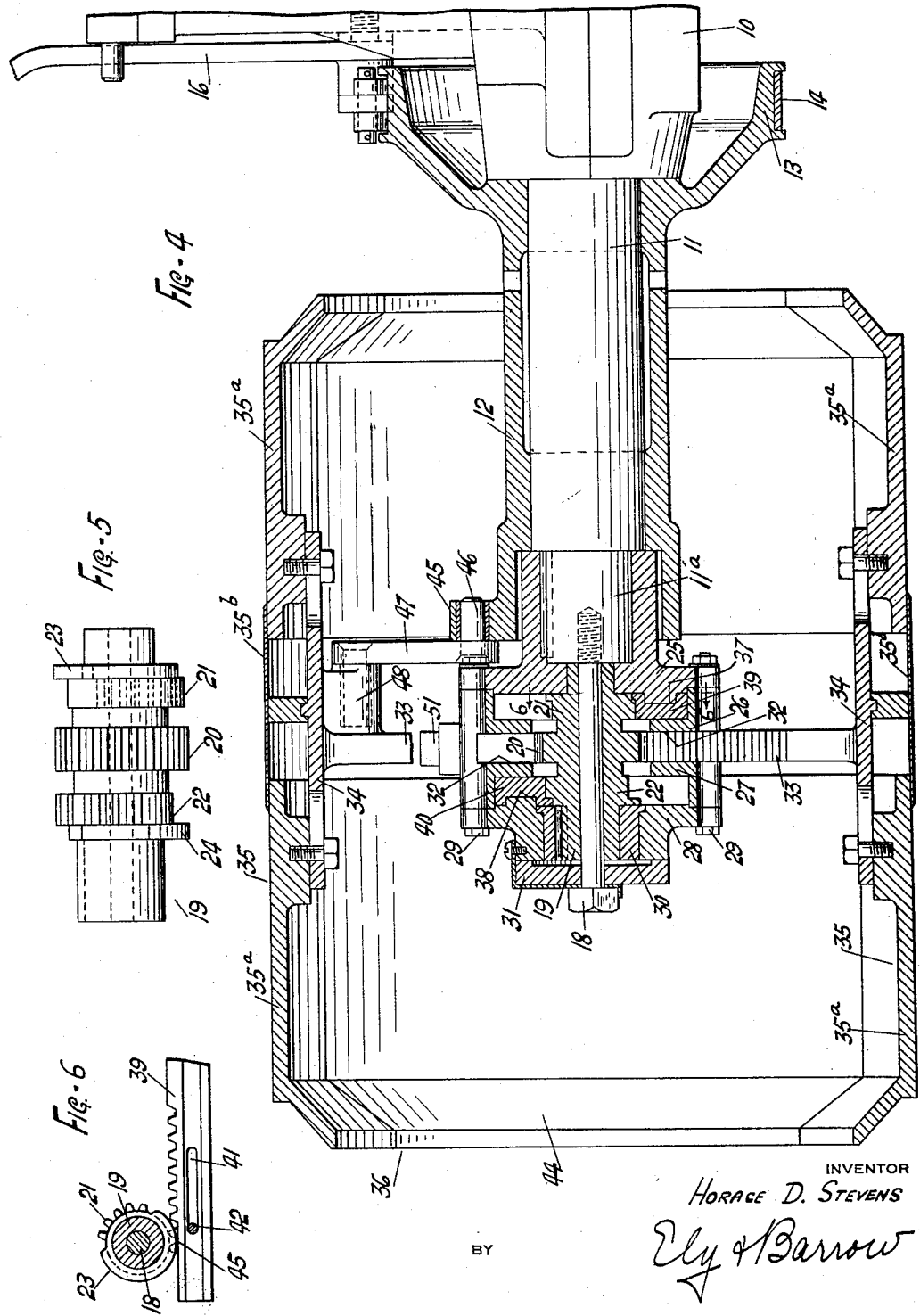

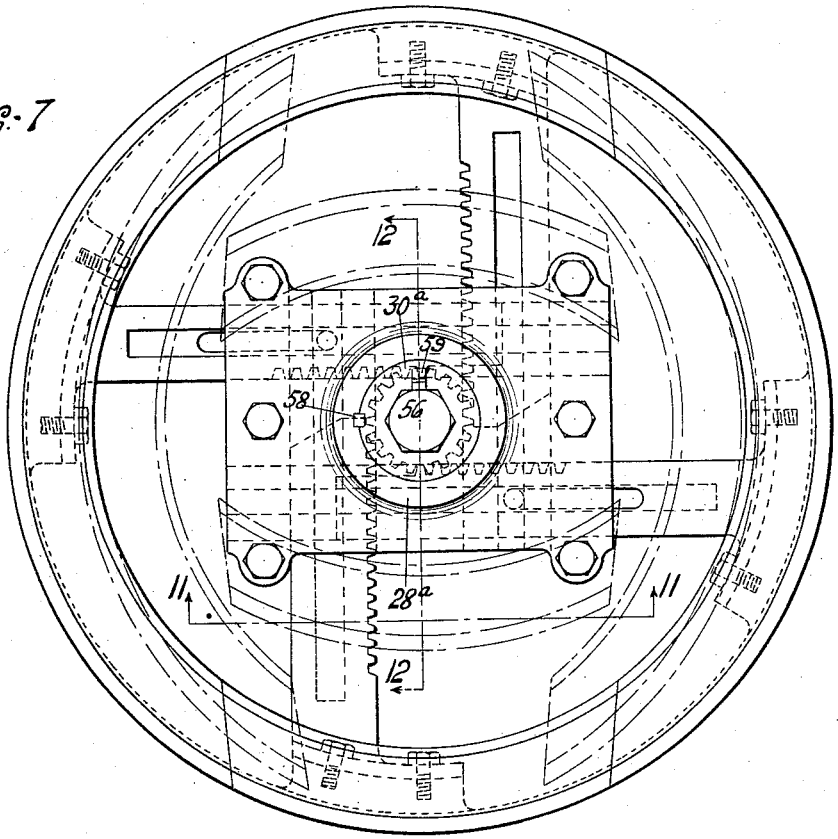
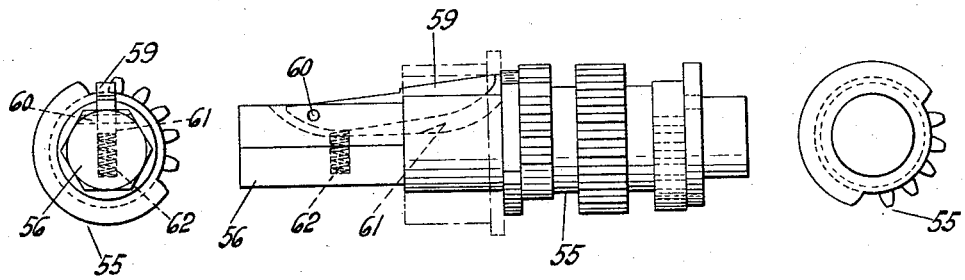

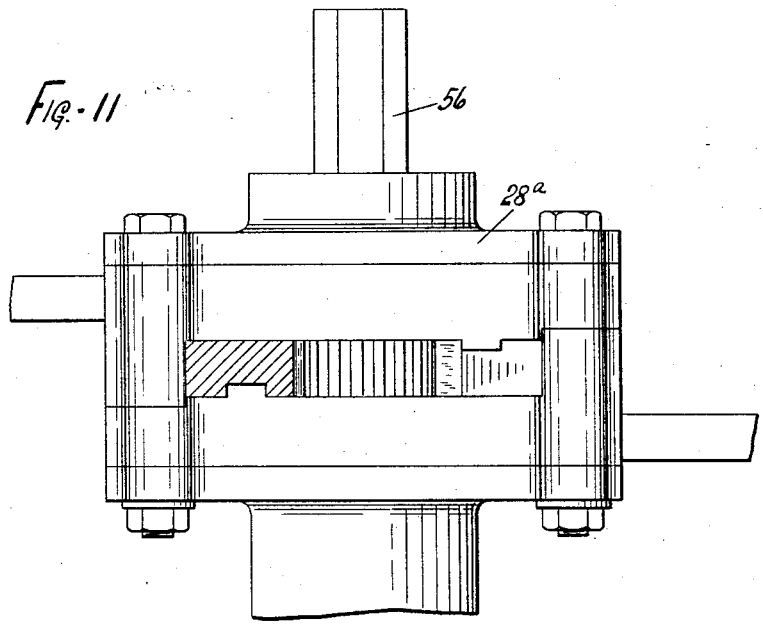
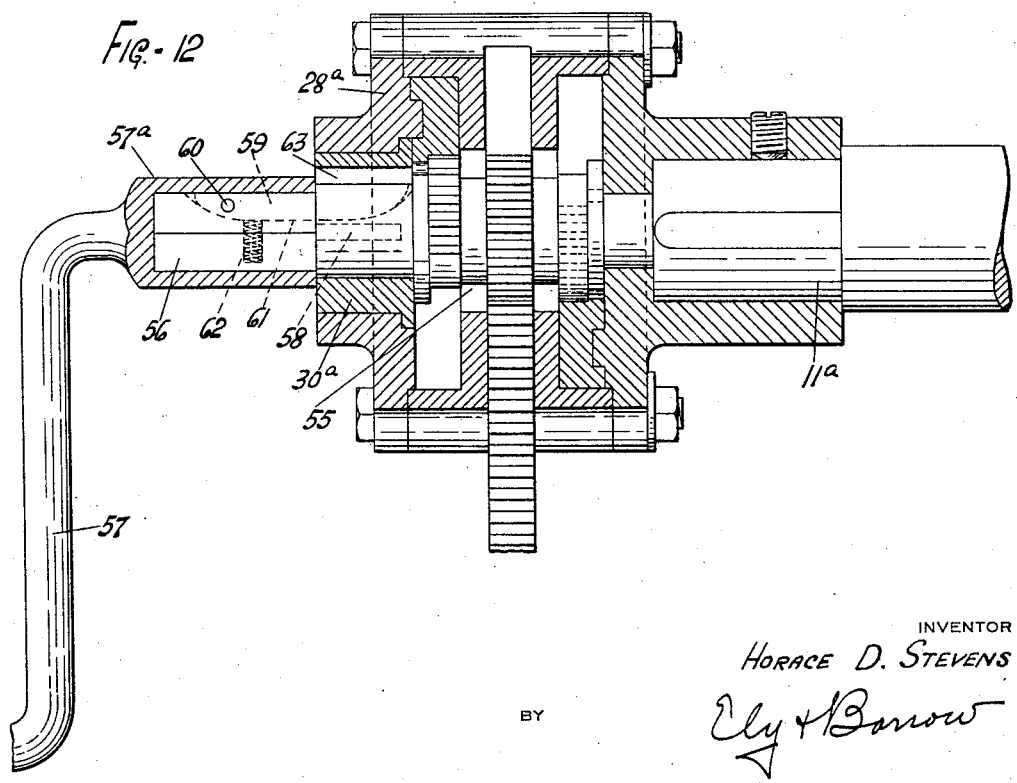

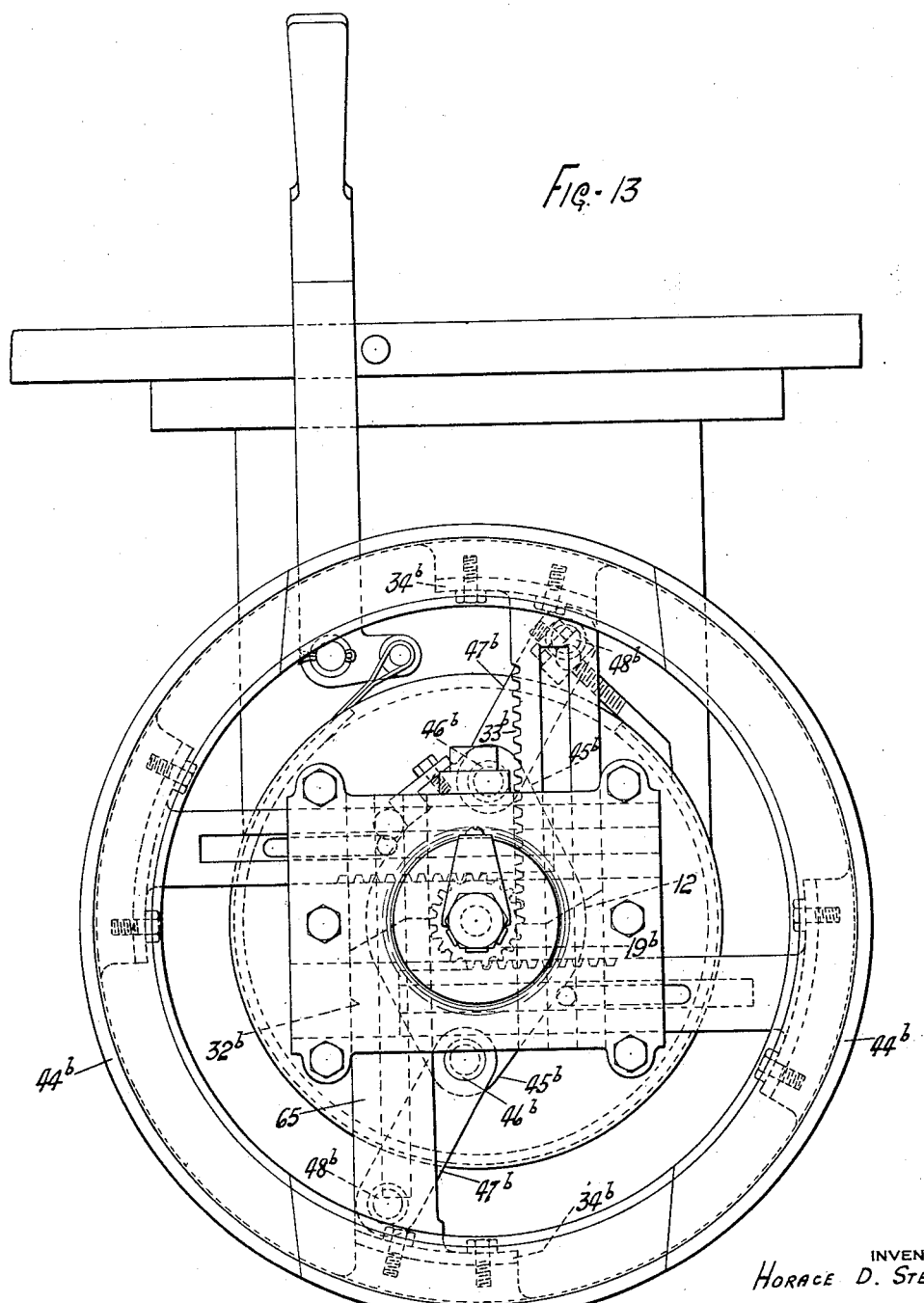

Patented Mar. 28, 1933

1,903,202

UNITED STATES PATENT OFFICE

HORACE D. STEVENS, OF AKRON, OHIO, ASSIGNOR TO THE FIRESTONE TIRE & RUBBER COMPANY, OF AKRON, OHIO, A CORPORATION OF OHIO

COLLAPSIBLE TIRE FORM

Application filed March 11, 1931. Serial No. 521,644.

This invention relates to collapsible tire-forms, and more especially it relates to collapsible tire-building cores or drums upon which pneumatic tire casings are fabricated.

The chief objects of the invention are to provide a collapsible form in which the respective sections thereof are symmetrically disposed when the form is in collapsed condition; to provide a collapsible form in which all of the sections are moved inwardly; to provide for easy removal of a tire from the collapsed form; and to provide a collapsible form adapted for manual or power operation.

Of the accompanying drawings:

Figure 4 is a section on line 4—4 of Figure 1;

Figure 5 is a detail side elevation, on a larger scale, of the hub portion of the structures shown in Figures 1 to 4.

Figure 6 is a detail section on line 6—6 of Figure 4.

Figure 7 is a front elevation of the invention embodied in a manually operated structure;

Figure 8 is a detail side elevation of the hub portion of the structure shown in Figure 7;

Figure 9 is an end elevation of the structure shown in Figure 8 as viewed from the left thereof;

Figure 10 is an end elevation of the structure shown in Figure 8 as viewed from the right thereof;

Figure 11 is a section on the line 11—11 of Figure 7;

Figure 12 is a section on the line 12—12 of Figure 7, and an operating handle shown in operative relation thereto; and Figure 13 is a front elevation of another modified form of drum embodying the principles of the invention.

Figure 1:
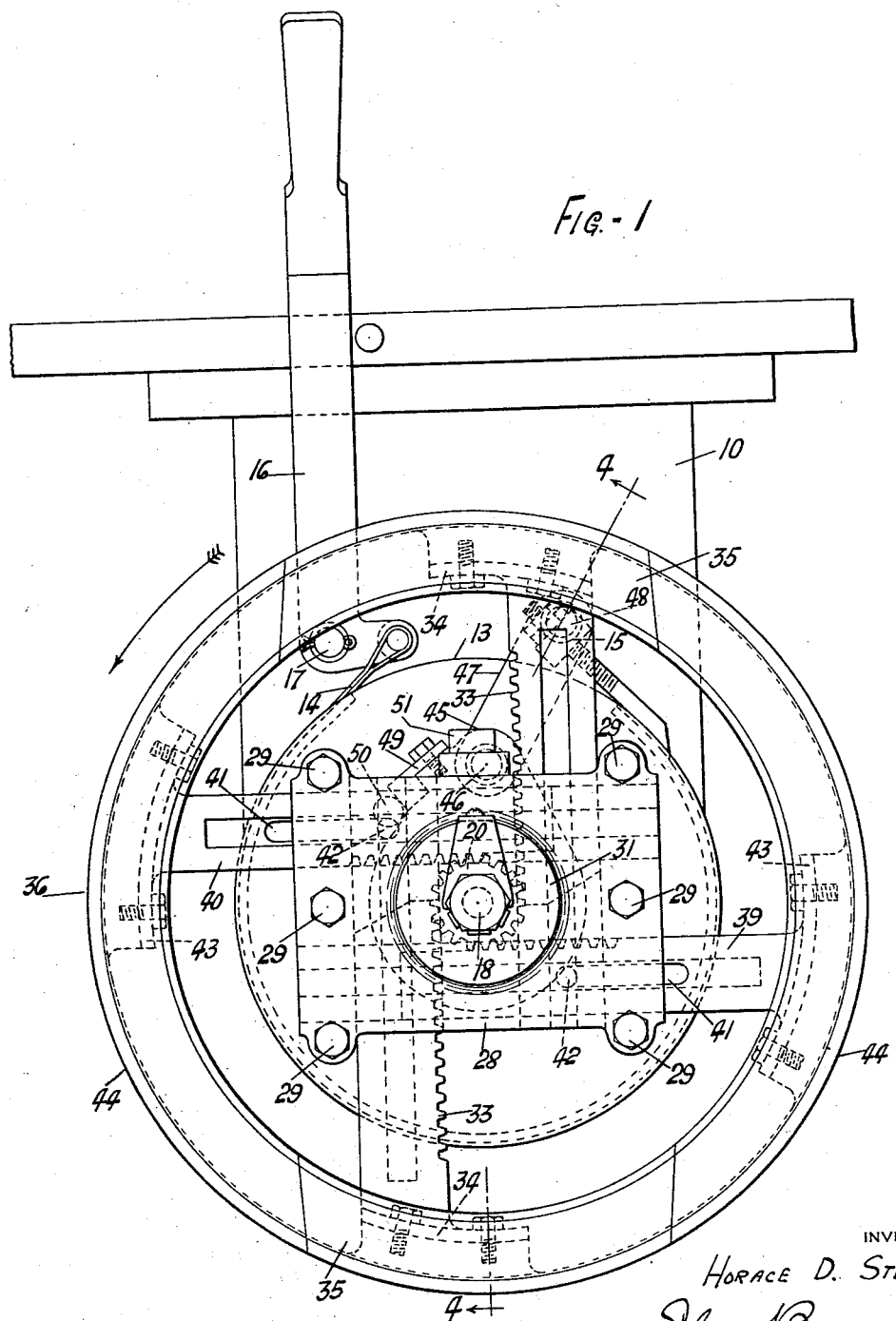
Figure 1 is a front elevation of a collapsible drum embodying the invention in its preferred form, and equipped for power operation.
Figure 2:
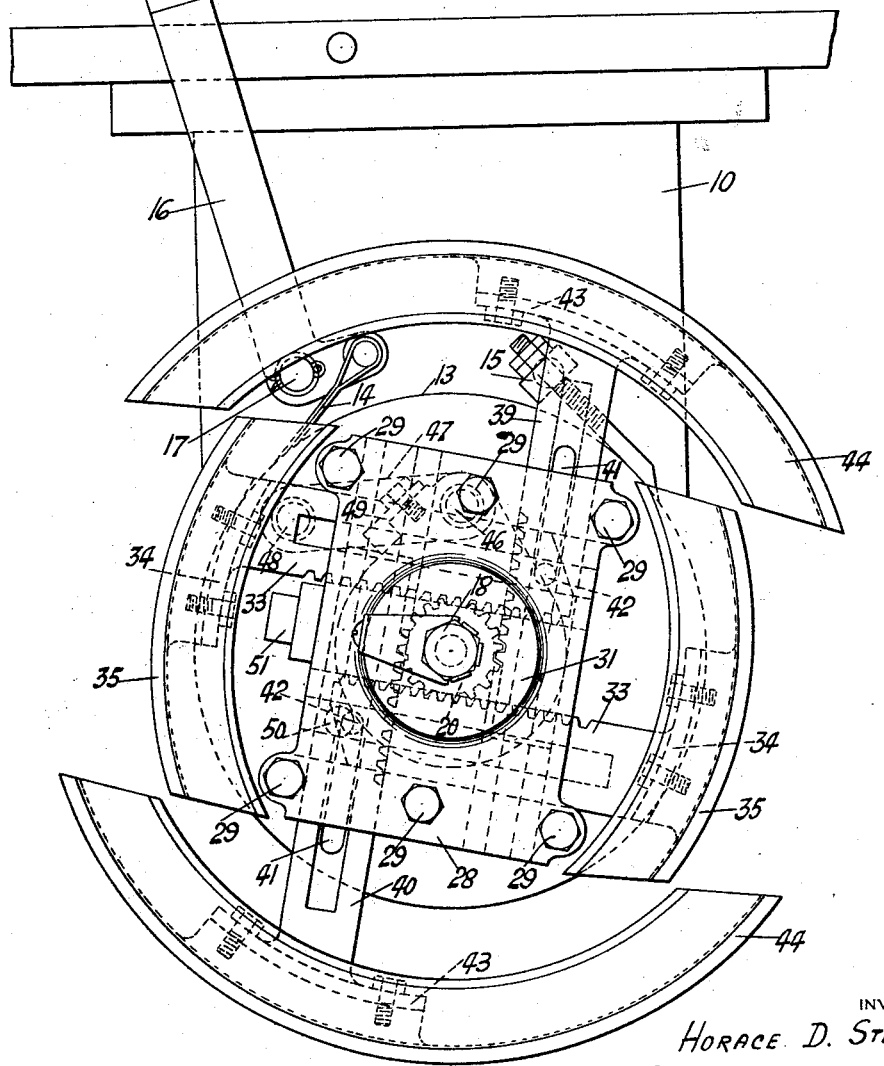
Figure 2 is a view of the structure shown in Figure 1 as it appears after the initial collapsing movement.
Figure 3:
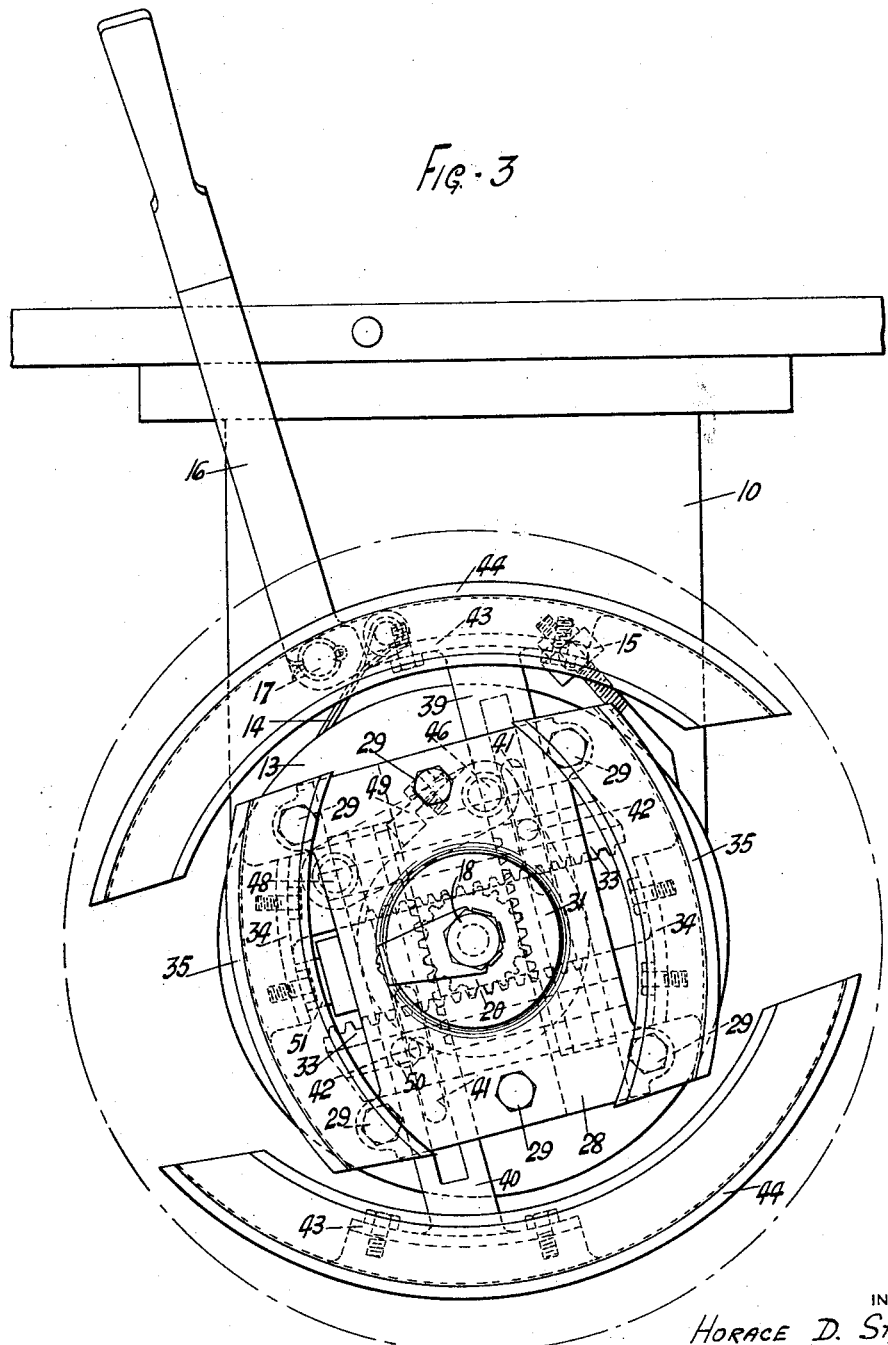
Figure 3 is a view of the improved collapsible drum in fully collapsed condition.

Referring now to the illustrative embodiment of the invention shown in Figures 1 to 6 of the drawings, 10 is a part of the housing of a tire building machine of any known or preferred construction, 11 is a horizontal rotatable spindle extending exteriorly thereof and formed with an end portion 11$^a$ of reduced diameter, and 12 is a sleeve journaled upon the spindle 11 and having limited rotatability with relation thereto. The inner end of the sleeve 12, adjacent the housing 10, is integrally formed with a brake drum 13, and engaging the latter is a brake-band 14 that has one of its ends adjustably secured to a bracket 15 that is swiveled on the housing 10, and has its other end connected to a lever-arm 16 that is pivotally mounted at 17 upon said housing 10.

Threaded into the end of the spindle 11 coaxially thereof is an elongate cap screw 18 constituting an axle for a pinion structure 19 that is journaled thereon. The pinion structure 19 comprises a centrally positioned complete pinion 20, respective mutilated pinions 21, 22 positioned on opposite sides of the pinion 20, and cams 23, 24 positioned beside the mutilated pinions 21, 22 respectively. The toothed portions of the mutilated pinions 21, 22 are diametrically opposite each other, and both cams 23, 24 are formed with concentric high and low regions, the high regions being of the same height as the teeth of the pinions and disposed beside the mutilated or toothless portions of the respective pinions 21, 22, the low portions of the cams being disposed beside the teeth of said pinions, the low perimeters being coincident with the root diameters of the teeth.

Mounted upon the end portion of the spindle 11 is a hub member comprising an inner plate 25 that is keyed to the reduced portion 11$^a$ of the spindle, center plates 26, 27, and an outer plate 28, said plates being assembled together by means of bolts 29, 29. A bushing 30 is journaled in an axial aperture in the hub plate 28 and keyed to the pinion structure 19, the arrangement permitting relative angular movement of the hub and pinion structure. The hub is retained upon the spindle 11 by means of a hub cap 31 that is held against the outer hub plate 28 by the cap screw 18.

The center plates 26, 27 of the hub are so formed on their adjacent faces that they define a pair of guideways 32, 32 for respective racks 33, 33 that are mounted therein, said racks being positioned on opposite sides of the pinion structure 19 and meshed with the pinion 20 thereof. The racks 33, 33 are parallel to each other, and on their respective outer ends carry brackets 34, 34 on which are mounted key-sections 35, 35 of a collapsible tire-building drum 36. As is most clearly shown in Figure 4, the drum is of the usual laterally-extensible type, the key sections comprising a pair of lateral sectors 35$^a$, 35$^a$ adjustably mounted upon each bracket 34, and a central plate 35$^b$ mounted upon each bracket and overlying the adjacent margins of said sectors.

In similar manner the hub plates 25, 26 are so formed on their adjacent surfaces that they define a guideway 37, and the plates 27, 28 define a guideway 38, said guideways being parallel and disposed diametrically opposite each other with relation to the pinion structure 19. Slidably mounted in the guideway 37 is a rack 39 that is adapted to mesh with the mutilated pinion 21, and similarly mounted in the guideway 38 is a rack 40 adapted to mesh with the mutilated pinion 22. Each rack 39, 40 is formed with longitudinal slots 41, and extending into said slots are respective pins 42 mounted in the hub plates 25, 28, the arrangement being such as to limit the extent of the outward movement of the racks under the impetus of the said mutilated pinions.

The outer ends of the racks 39, 40 are provided with suitable brackets 43, 43, and mounted on said brackets are respective intermediate drum-sections 44, 44 of the drum 36, said sections being similar in structure to the key-sections 35, 35 and complemental thereto, the four sections constituting a complete annular drum.

The racks 39, 40 have their lower teeth cut away at one side to provide plane surfaces such as the surface 39$^a$, Figure 6, on which the elevated portions of the respective cams 23, 24 are adapted to slide when the teeth of the racks and mutilated pinions are not meshed, the arrangement being such that the elevated portion of each cam engages the pinion-tooth at the end of the said plane surface of the rack, as is most clearly shown in Figure 6, with the result that retractive movement of the rack is prevented, and the rack is supported in position to be engaged by the teeth of the mutilated gear when the latter is rotated.

The outer end portion of the sleeve 12 is formed with an outwardly-extending ear 45 that is pivotally connected at 46 to one end of a link 47, the other end of the latter being pivotally connected at 48 to one of the brackets 34. Mounted upon the ear 45 is a gauge-plate 49 that is adapted to engage a stud 50 projecting rearwardly from the inner hub-plate 25 for determining the relative angular positions of the spindle 11 and sleeve 12 when the drum is in its assembled, operative condition. As is clearly shown in Figure 1, when the drum is in assembled, operative condition the pivot point 48 is overcenter with relation to the axis of the drum and the pivot point 46, the arrangement being such that collapse of the drum from the pressure of tools against the periphery thereof is impossible.

In operation, the drum 36 is driven in the direction indicated by the arrow in Figure 1 through the spindle 11, and the sleeve 12 rotates with said spindle by reason of the overcenter position of the link 47 that connects the drum and sleeve structures. During the rotation of the drum a tire may be built thereon in the usual manner. When it is desired to remove a finished tire from the rotating drum, the latter is collapsed simply by applying the brake 14 to the brake drum 13, with the result that the rotary movement of the sleeve 12 is retarded or stopped and relative angular movement takes place between the sleeve and the spindle 11.

The initial result of the relative angular movement between sleeve and spindle is to move the pivot-point 48 over center with relation to pivot-point 46 and the axis of the drum. Since movement of the pivot-point 48 is about the axis 46, it will be seen that continued rotary movement of the drum will cause the link 47 to pull the key-section 35 connected thereto radially inward. The inward radial movement of one key-section 35 causes its supporting rack 33, which is meshed with the pinion 20 of the pinion structure 19, to rotate the latter on its pivot 18, relatively of the spindle 11, whereby the other rack 33 is concurrently moved inwardly and with it the other key-section 35. At about the time the drum sections reach the positions shown in Figure 2, the mutilated pinions 21, 22 have turned sufficiently to mesh with the racks 39, 40, and move the latter inwardly and with them the drum sections 44 thereon. Inward movement of the drum sections ceases when one of the brackets 34 abuts a yielding stop-cushion of rubber 51 suitably positioned upon the hub-assembly, the drum sections ultimately occupying the relative positions shown in Figure 3. When inward movement of the drum-sections ceases, the driving torque of the spindle is applied, through the link 47, to the braked sleeve 12, which quickly stops rotation of the spindle. The finished tire may then be easily and quickly removed from the drum.

The drum is restored to its operative assembled condition simply by releasing the brake on the sleeve and setting the spindle 11 in motion. Centrifugal force throws the respective drum sections outwardly, the sections 44 attaining their outermost positions when the ends of the slots 41 in the racks 39, 40 reach the studs 42. The key-sections 35 of the drum subsequently reach their outermost positions when the pivot point 48 moves over center with relation to axis of the drum and the pivot point 46, and the stud 50 and gauge-plate 49 abut each other as is shown in Figure 1.

The drum is easily and quickly operated without the necessity of reversing the drive thereof, is of relatively simple construction, and is sufficiently rugged to withstand, without breaking, the jolts and strains incidental to normal use.

In Figures 7 to 12 inclusive is shown a modified collapsible tire building form which is manually collapsed and assembled, but which retains the advantageous arrangement and construction of movable parts present in the preferred embodiment.

As is shown in Figure 12, the sleeve 12 of the preferred form is entirely dispensed with. The pinion structure 55 is journaled in the hub structure of the drum, and has a hexagonal axial shank 56 that extends forwardly from the front of the hub structure and is adapted to receive the socket portion 57ª of a hand crank 57 by which the pinion structure may be manually rotated, relatively of the hub structure and the spindle 11ª.

During normal operation of the drum the hub structure and pinion structure rotate as a unit, relative angular movement of the structures being prevented by a key 58 that secures the bushing 30ª in the hub plate 28ª, and a key 59 that connects the pinion structure to the bushing 30ª. The key 59 is pivotally secured at 60 in a longitudinally extending slot 61 formed in the shank 56 and adjacent end portion of the pinion structure, said key being backed by a compression spring 62 that normally urges the free end of the key outwardly into a keyway 63 in the bushing 30ª.

The arrangement is such that when the socket portion of the crank 57 is mounted upon the shank 56 of the pinion structure it automatically depresses the key 59 against the pressure of the spring 62 and moves the free end of the key out of the keyway 63, whereby relative angular movement of the pinion structure and hub structure is permitted upon turning of the crank 57. About one-quarter turn of the crank is sufficient fully to collapse the drum. Aside from the novel construction described the modified drum structure is identical with the preferred structure.

The collapsed drum is restored to assembled, operative condition manually by reversing the angular movement of the pinion structure by use of the hand crank, or it may be restored automatically simply by rotating the drum to cause centrifugal force to throw the respective drum sections outwardly, and thereby to cause such relative angular movement of the pinion structure and the hub as to move the key 59 into registry with the keyway 63, the key seating therein under the impetus of the spring 62.

In the second modified form of drum illustrated in Figure 13, sleeve 12 is formed with a pair of diametrically-disposed ears 45ᵇ, 45ᵇ which are pivotally connected at 46ᵇ, 46ᵇ to one end of each of the pair of links 47ᵇ, 47ᵇ, the other ends of said links being pivotally connected at 48ᵇ, 48ᵇ to each of the brackets 34ᵇ. The gear teeth preferably are omitted from bar 65 corresponding to one of the racks 33 of the form of drum shown in Figure 1.

Operation of the drum shown in Figure 13 is similar to the operation of the drum shown in Figure 1, except that both key-sections are drawn radially inwardly during the collapsing of the drum by means of the pair of links 47ᵇ, 47ᵇ. The inward reciprocation of rack 33ᵇ rotates pinion structure 19ᵇ which in turn collapses intermediate drum sections 44ᵇ, 44ᵇ as in the first described manner of operation. Bar 65 slides in its corresponding guideway 32ᵇ and is drawn radially inwardly solely by means of its link 47ᵇ. When the drum is expanded to operative, assembled condition, bar 65 with the key-section supported thereby is moved radially outwardly by means of link 47ᵇ, this movement being independent of the rotation of pinion structure 19ᵇ. This independent movement obviates incomplete expansion of the drum which might occur from excessive wear in the gear teeth on the racks and pinions. The other key-section and the intermediate sections will meanwhile be reciprocated to their normal outer positions by operation of their racks with pinion structure 19ᵇ as in the operation of the drum shown in Figure 1.

Other modifications are possible within the scope of the appended claims which are not limited wholly to the specific constructions shown and described.

What is claimed is:

1. In a collapsible tire building form, the combination of a pair key sections and a pair of intermediate sections constituting an annular form, respective racks secured to each of said sections, and pinions engaging said racks, said pinions being adapted for concurrent rotary movement, and so constructed as successively to move the key sections and the intermediate sections radially inward in a predetermined definite sequence.

2. A combination as defined in claim 1 in which two of the pinions are mutilated pinions.

3. In a collapsible tire-building form, the combination of a plurality of arcuate form-sections constituting an annular form, means for moving one of said sections radially inward, and means connected to said moving means for moving other of said sections radially inward after said first section has moved inward to a predetermined degree.

4. In a collapsible tire-building form the combination of a pair of key sections and a pair of intermediate sections constituting an annular form, a plurality of gears interconnecting all of said sections, all of said gears being affixed to a common shaft, and means for moving one of the key sections radially inward to effect concurrent inward movement of the other key section and succeeding inward movement of the intermediate sections by reason of the interconnecting gearing.

5. A combination as defined in claim 4 in which the gearing comprises a pair of mutilated gears.

6. A collapsible tire-building form comprising a plurality of arcuate form-sections constituting an annular form, means for supporting and driving the same, gear means interconnecting all of said form sections, said gear means being so constructed and arranged that inward movement of one section effects positive inward movement of the other sections in a predetermined sequence, and means movable relatively of the form-driving means for effecting inward movement of one of the sections.

7. A collapsible tire-building form comprising a plurality of arcuate form-sections constituting an annular form, a rotatable spindle supporting and driving the same, a sleeve on said spindle relatively movable angularly thereof, gear means interconnecting all of said form sections, and so constructed and arranged that radially inward movement of one section effects inward movement of the other sections, and means connecting the sleeve to one of the form sections for effecting inward movement of the latter when the sleeve moves relatively of the spindle.

8. A collapsible tire-building form comprising a pair of arcuate key sections and a pair of intermediate sections constituting an annular form, a rotatable spindle supporting and driving said form, a sleeve on said spindle relatively movable angularly thereof, gear means interconnecting all of said form sections, and so constructed and arranged that radially inward movement of one key section effects concurrent inward movement of the other key section and subsequent inward movement of the intermediate sections, and a link connecting the sleeve to a key section for moving the latter inwardly when the sleeve moves relatively of the spindle.

9. A combination as defined in claim 8 in which the gearing comprises a pair of mutilated pinions.

10. A collapsible tire-building form comprising a pair of key sections and a pair of intermediate sections constituting an annular form, respective racks secured to each of said sections, a pinion meshed with the racks of the key sections, respective mutilated pinions meshed with the racks of the intermediate sections, and means for rotating the pinions in unison whereby the key sections concurrently are moved radially inward and subsequently the intermediate sections are similarly moved.

11. A combination as defined in claim 10 in which the mutilated pinions are out of mesh with their racks in the outermost position of the intermediate sections, including cam means for preventing inward movement of said sections when the pinions are so unmeshed.

12. A collapsible tire-building form comprising a plurality of arcuate form-sections constituting an annular form, a hub member, respective racks secured to said form sections and slidably mounted in said hub, a pinion structure mounted in said hub and meshed with said racks for moving the form-sections radially, said pinion structure normally being keyed to said hub so as to rotate therewith, and means for rotating the pinion structure relatively of the hub including means for unkeying the latter from the pinion structure.

13. A combination as defined in claim 12 including a pivotally mounted key between the hub and pinion structure adapted to be moved out of the keyway in one of said structures by the application of a member for rotating the pinion structure.

14. A collapsible tire-building form comprising a pair of key-sections and a pair of intermediate sections constituting an annular form, a hub, links connecting said key-sections to said hub for collapsing or expanding said key-sections, and gear means interconnecting one of said key-sections with the intermediate sections for collapsing or expanding said intermediate sections.

In witness whereof, I have hereunto affixed my hand, this 3rd day of March, 1931.

HORACE D. STEVENS.